(12) United States Patent
Gretz

(10) Patent No.: US 7,262,370 B1
(45) Date of Patent: Aug. 28, 2007

(54) CABLE SUPPORT ASSEMBLY FOR MINIMIZING BEND RADIUS OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/471,237

(22) Filed: Jun. 20, 2006

(51) Int. Cl.
H02B 1/40 (2006.01)

(52) U.S. Cl. ............ 174/480; 174/481; 174/68.3; 174/68.1; 248/68.1; 248/49; 248/58

(58) Field of Classification Search ........... 174/480, 174/481, 491, 503, 504, 506, 60, 61, 64, 174/68.1, 68.3, 71 R, 72 R, 72 A, 88 R, 174/70 C, 99 R, 135; 248/49, 60, 56, 58, 248/57, 63, 65, 68.1, 73, 200, 317, 343, 72, 248/55, 74.3; 211/113; 52/220.1, 220.3, 52/220.5, 220.7, 220.8, 731.1, 733.1, 733.2, 52/736.2; 385/134, 135, 136
See application file for complete search history.

(56) References Cited

U.S. PATENT DOCUMENTS

| | | | |
|---|---|---|---|
| 1,992,574 A * | 2/1935 | Jenkins | 174/68.3 |
| 2,368,619 A * | 2/1945 | Soderberg | 248/65 |
| 3,266,761 A * | 8/1966 | Walton et al. | 248/74.3 |
| 3,302,350 A * | 2/1967 | Brown et al. | 174/101 |
| 3,836,936 A * | 9/1974 | Clement | 174/481 |
| 4,077,434 A | 3/1978 | Sieckert et al. | |
| 5,663,527 A * | 9/1997 | Hui | 174/68.3 |
| 5,709,249 A | 1/1998 | Okada et al. | |
| 5,765,786 A * | 6/1998 | Gretz | 248/68.1 |
| 5,943,838 A * | 8/1999 | Madsen et al. | 52/733.2 |
| 6,143,984 A * | 11/2000 | Auteri | 174/68.3 |
| 6,399,883 B1 | 6/2002 | Lhota | |
| 6,517,032 B1 * | 2/2003 | Gretz | 248/68.1 |
| 6,521,835 B1 * | 2/2003 | Walsh | 174/68.3 |
| 6,556,762 B1 * | 4/2003 | Erickson et al. | 248/49 |
| 6,629,676 B1 * | 10/2003 | Gretz | 248/58 |
| 6,903,275 B1 | 6/2005 | Jetton | |
| 6,959,898 B1 * | 11/2005 | Laughlin et al. | 248/60 |
| 7,021,591 B1 * | 4/2006 | Gretz | 248/68.1 |

* cited by examiner

Primary Examiner—Angel R. Estrada (57) ABSTRACT

A cable support assembly for routing electrical, communication, or data cables throughout a building. The cable support assembly includes cable trays and brackets for securing the cable trays to an overhead structure. Tray couplers are provided for coupling tray sections together. The brackets include a base portion and an integral downward-depending band. The brackets are first secured to the overhead structure to establish a desired path for the cables. A cable tray is then slid end-wise through the secured brackets and is cradled by the downward-depending bands. Adjacent cable trays are joined with couplers to create a cable support assembly in which the cable tray provides support for any electrical, communication, or data cables installed therein. The base portion of the brackets includes a cuttable portion that can be cut to split the base portion and thereby enable the brackets to be used for supporting cables in a retrofit situation.

17 Claims, 11 Drawing Sheets

CABLE SUPPORT ASSEMBLY FOR MINIMIZING BEND RADIUS OF CABLES

FIELD OF THE INVENTION

This invention relates to cable supports and specifically to a cable support assembly or cable raceway that supports electrical cables in such a manner that the bend radius of individual cables is minimized.

BACKGROUND OF THE INVENTION

The installation of electrical cables in buildings is typically accomplished by drilling holes in wooden support elements such as joists or studs or using existing holes in metal support elements and routing the cables through the holes. Routing electrical cables in this manner causes each cable to be supported by the narrow thickness of the support element and will lead to sagging of cables in the open spaces between the support elements. Unfortunately, for the installation of low voltage cables such as communication or database cables, sagging can disturb the conductors within the cables. Bending and twisting of conductors can adversely affect the data transmission rate, which becomes very critical in cables having higher transmission rates, such as Category 5 telecommunications cables.

Various methods proposed for the support of low voltage electrical cables include the use of hangers for supporting the cables and cable pans or raceways.

What is needed is a simple cable support assembly in which the cable tray provides the support for the installed cables. The cable support assembly should also allow easy lowering of the cable tray, when desired, to facilitate inspection, repair, or installation of additional cables. The cable support assembly should be capable of supporting cables or cable bundles in a new installation or in a retrofit situation to support cables that have been previously installed.

SUMMARY OF THE INVENTION

The invention is a cable support assembly for routing electrical, communication, or data cables throughout a building. The cable support assembly includes cable trays and brackets for securing the cable trays to an overhead structure. Tray couplers are provided for coupling tray sections together. The brackets include a base portion and an integral downward-depending band. The brackets are first secured to the overhead structure to establish a desired path for the cables. A cable tray is then slid end-wise through the secured brackets and is cradled by the downward-depending bands. Adjacent cable trays are joined with couplers to create a cable support assembly in which the cable tray provides support for any electrical, communication, or data cables installed therein. The base portion of the brackets includes a cuttable portion that can be cut to split the base portion and thereby enable the brackets to be used for supporting cables in a retrofit situation.

OBJECTS AND ADVANTAGES

Several advantages are achieved with the cable support assembly of the present invention, including:
 (1) The hanger brackets of the cable support assembly are located exterior of the cable tray, thereby ensuring that the cables or cable bundles are supported by the cable tray and not by the hangers, thereby eliminating any possibility of cable sag which could be detrimental to the data transfer capabilities of the installed cables.
 (2) The cable brackets of the present invention provide an easy method of creating a cable raceway within a building structure.
 (3) The cable brackets include a cuttable portion to enable separation and spreading of the base portion to enable installing the brackets in a retrofit situation around previously suspended cables.
 (4) The brackets include an integral seat to enable rapid positioning of the brackets with respect to an overhead support.

These and other objects and advantages of the present invention will be better understood by reading the following description along with reference to the drawings.

| INDEX TO REFERENCE NUMERALS IN DRAWINGS | |
|---|---|
| 30 | cable support assembly |
| 32 | bracket, preferred embodiment |
| 34 | cable tray |
| 36 | base portion |
| 36A | first half of split base portion |
| 36B | second half of split base portion |
| 38 | downward-depending band |
| 40 | building structure |
| 42 | fastener |
| 44 | end portion |
| 46 | second end of hinge arm |
| 50 | first side of bracket |
| 52 | second side of bracket |
| 54 | tooth |
| 56 | upper planar edge |
| 58 | seat |
| 59 | ear |
| 60 | attachment arrangement |
| 62 | aperture in ear |
| 64 | slot in base portion |
| 66 | cuttable portion |
| 68 | central opening of bracket |
| 82 | first leg of hinge arm |
| 84 | second leg of hinge arm |
| 86 | third leg of hinge arm |
| 88 | bottom wall of cable tray |
| 90 | sidewall of cable tray |
| 92 | end of cable tray |
| 94 | interior channel |
| 96 | coupler |
| 98 | bottom wall of coupler |
| 100 | sidewall of coupler |
| 102 | top lip |
| 104 | inner lip |
| 106 | separator tab |
| 108 | end cap |
| 110 | end wall |
| 112 | outer edge |
| 114 | peripheral wall |
| 116 | post |
| 117 | large entryway |
| 118 | joist |
| 120 | communications cable |
| 122 | bracket, second embodiment |
| 124 | base portion |
| 126 | band portion |
| 128 | planar first edge |
| 130 | second edge |
| 132 | upper planar edge |
| 134 | seat |
| 140 | bracket, third embodiment |
| 142 | base portion |
| 144 | first side of base portion |
| 146 | second side of base portion |
| 148 | integral flange |
| 150 | attachment arrangement |
| 152 | aperture |
| 154 | fastener |
| 156 | seat |
| 158 | band portion |
| 160 | central opening |
| $d_1$ | distance between post and peripheral wall of end cap |
| $d_2$ | thickness of bottom wall and sidewall of cable tray |
| W1 | width of base portion |
| W2 | width of band portion |
| θ | angle of cable tray sidewalls with respect to bottom wall |

DETAILED DESCRIPTION OF THE INVENTION

Figure 16:
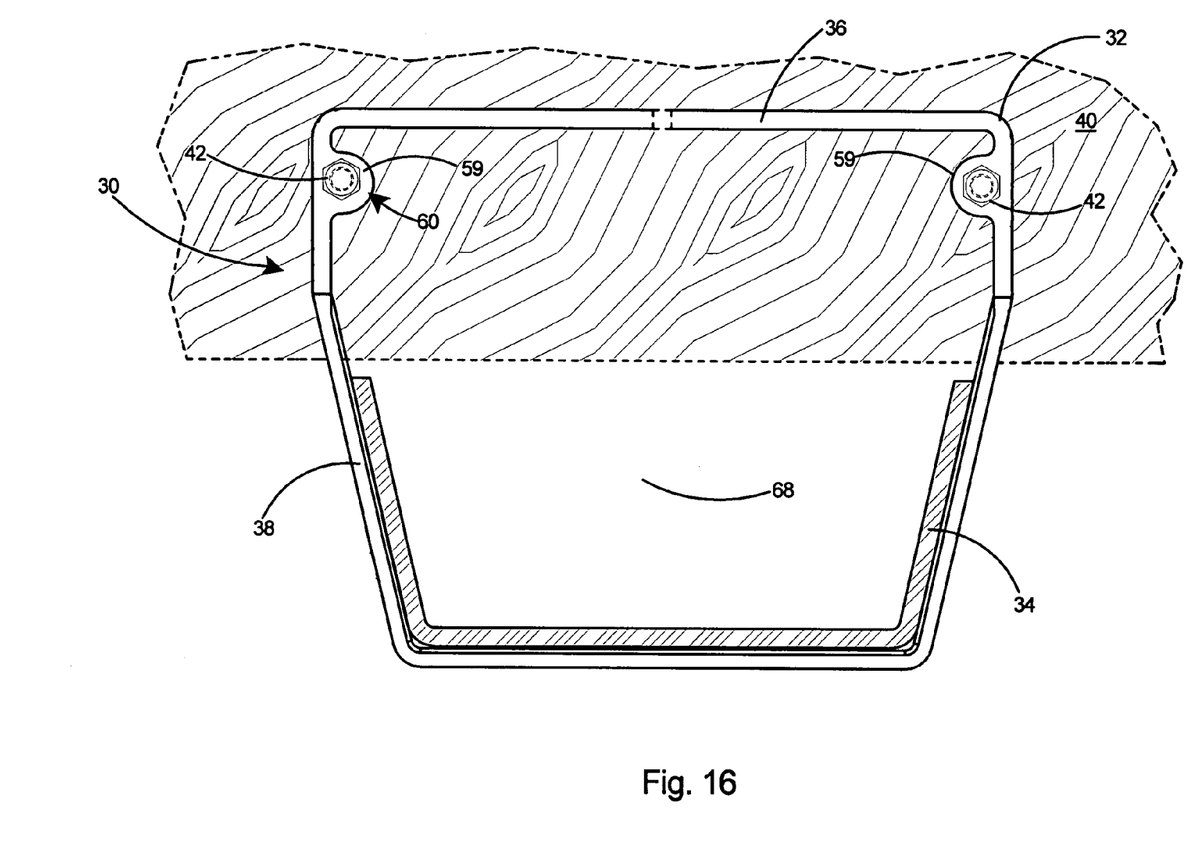
FIG. 16 is an end view of the latch bracket assembly of FIG. 15 with a cable tray inserted in the bracket.

With reference to FIG. 16 there is shown a preferred embodiment of a cable support assembly 30, which includes a bracket 32 and an elongated cable tray 34. The bracket 32 includes a base portion 36 and a downward-depending band 38. The bracket 32 is shown in FIG. 16 secured to a building structure 40 by fasteners 42.

Referring to FIGS. 1-4, the base portion 36 includes two end portions 44 with the downward-depending band 38 integrally attached to each end portion 44. The bracket 32 includes a first 50 and second side 52. A tooth 54 extends outwards from the first side 50 of the bracket 32 and includes an upper planar edge 56 that includes a seat 58 thereon. The end portions 44 of the bracket 32 have ears 59 extending inwards therefrom and an attachment arrangement 60 for securing the bracket to a building structure (not shown). The attachment arrangement 60 includes apertures 62 in the ears 59 and fasteners 42 associated with one or more of the apertures 62. The base portion 36 of the bracket 32 includes a slot 64 therein that defines a cuttable portion 66 to enable separation and spreading of the base portion 36 to enable installing the bracket in a retrofit situation around previously suspended cables. If preferred, the base portion 36 may be placed against a support with the seat 58 fit flush against a rafter or joist, in which case fasteners can be driven into the rafter or joist though both the ears 59. The bracket 32 includes a central opening 68 defined by the base portion 36 and band 38.

Figure 8:
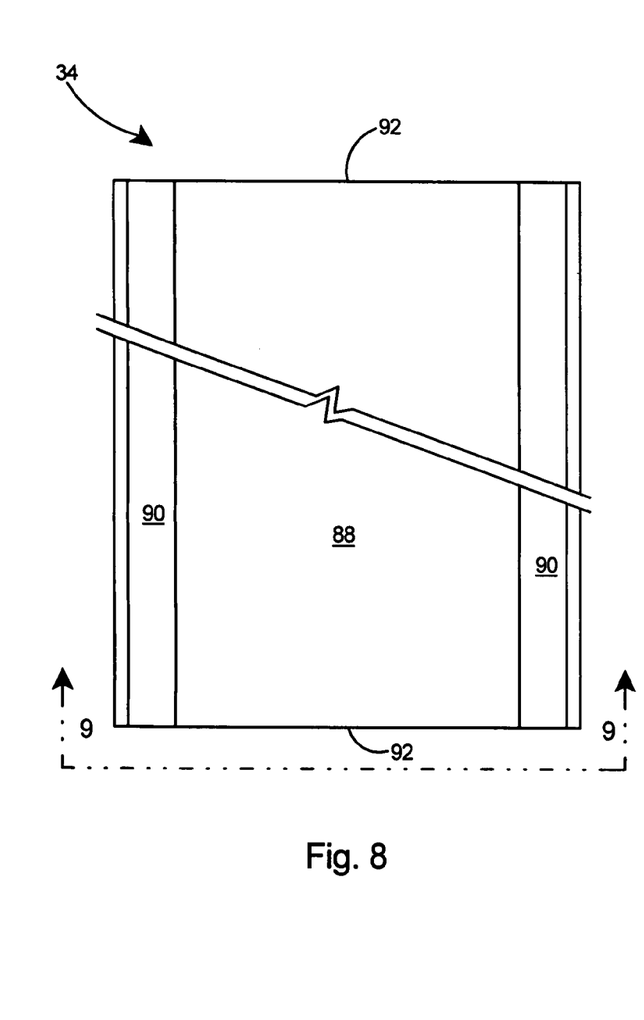
FIG. 8 is a top view of the preferred embodiment of a cable tray according to the present invention.
Figure 9:
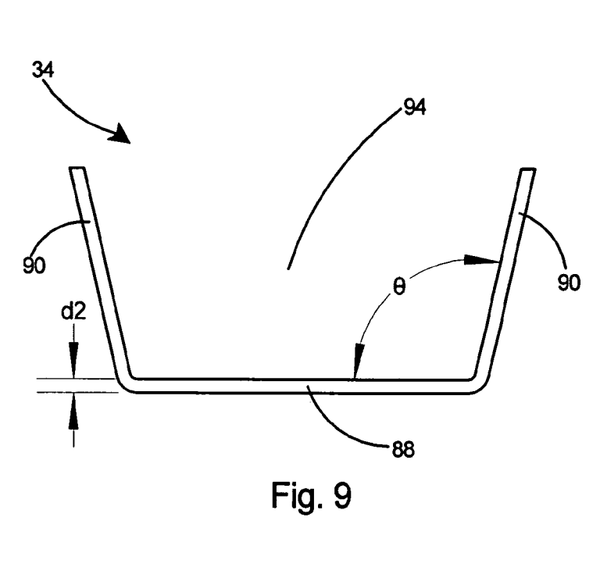
FIG. 9 is an end view of the cable tray taken along line 9-9 of FIG. 8.

With reference to FIGS. 8-9, the elongated cable tray 34 includes a bottom wall 88, two sidewalls 90, and two ends 92. The sidewalls 90 are preferably at an angle θ of between 95 and 110 degrees with respect to the bottom wall 88. The bottom wall 88 and sidewalls 90 of the cable tray 34 define an interior channel 94 capable of receiving and supporting therein electrical, communication, or data cables or cable bundles (not shown). The cable tray 34 is provided in lengths, as measured between the two ends 92, preferably between 4 and 15 feet.

Figures 10, 11, 12:
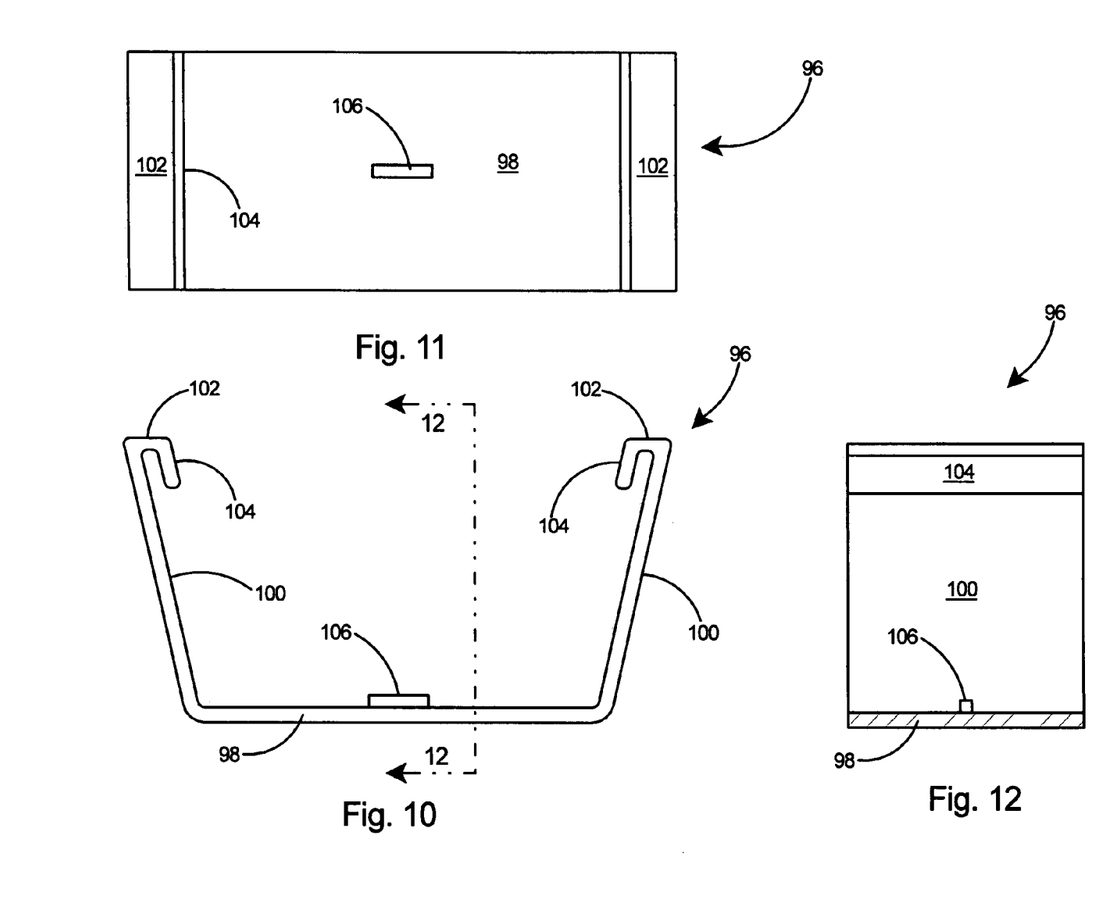
FIG. 10 is a front elevation view of the preferred embodiment of a coupler according to the present invention.
FIG. 11 is a top view of the coupler taken along line 11-11 of FIG. 10.
FIG. 12 is a sectional view of the coupler taken along line 12-12 of FIG. 10.

With reference to FIGS. 10-12, the cable support assembly includes a coupler 96 for connecting two of the cable trays together. The coupler 96 includes a bottom wall 98, two sidewalls 100, top lip 102 extending inwardly from the sidewalls 100, and an inner lip 104 extending downward from the top lip 102. A separator tab 106 extends upward from the bottom wall 98 of the coupler 96. The separator tab 106 will function to limit the distance a cable tray may be inserted in the coupler 96.

Figure 13:
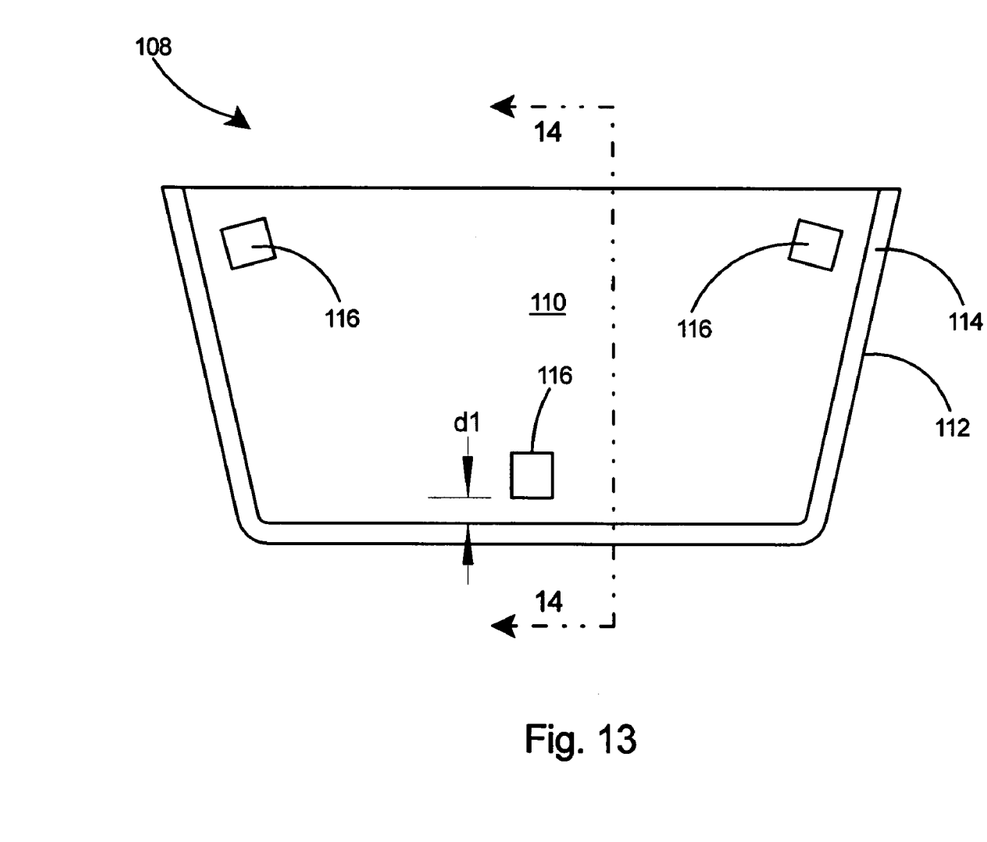
FIG. 13 is a plan view of the preferred embodiment of an end cap according to the present invention.
Figure 14:
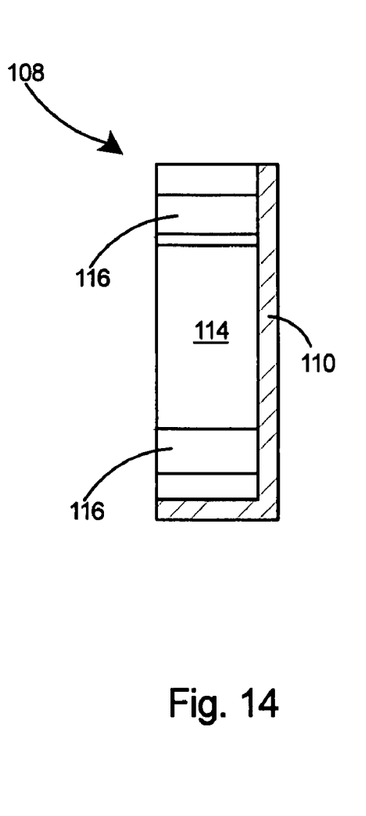
FIG. 14 is a sectional view of the end cap taken along line 14-14 of FIG. 13.

Referring to FIGS. 13-14, the cable support assembly of the present invention includes an end cap 108 for closing the open end of the cable tray. The end cap 108 includes an end wall 110 having an outer edge 112 and a peripheral wall 114 extending orthogonally from the outer edge 112. One or more posts 116 extend orthogonally from the end wall 110 proximate the peripheral wall 114. The posts 116 extend as far as does the peripheral wall 114 from the end wall 110.

With reference to FIG. 16, to operate the current invention, brackets 32 are secured to an overhead building structure 40 such as a joist or rafter. At least two brackets 32 (one shown) are secured to the overhead structure to support each cable tray 34. Each bracket is secured to the building structure using the attachment arrangement 60, including fasteners 42 driven through ears 59 into the building structure 40. Once the brackets 32 are mounted to the building structure 40, a cable tray 34 is slid lengthwise through the central opening 68.

Figure 17:
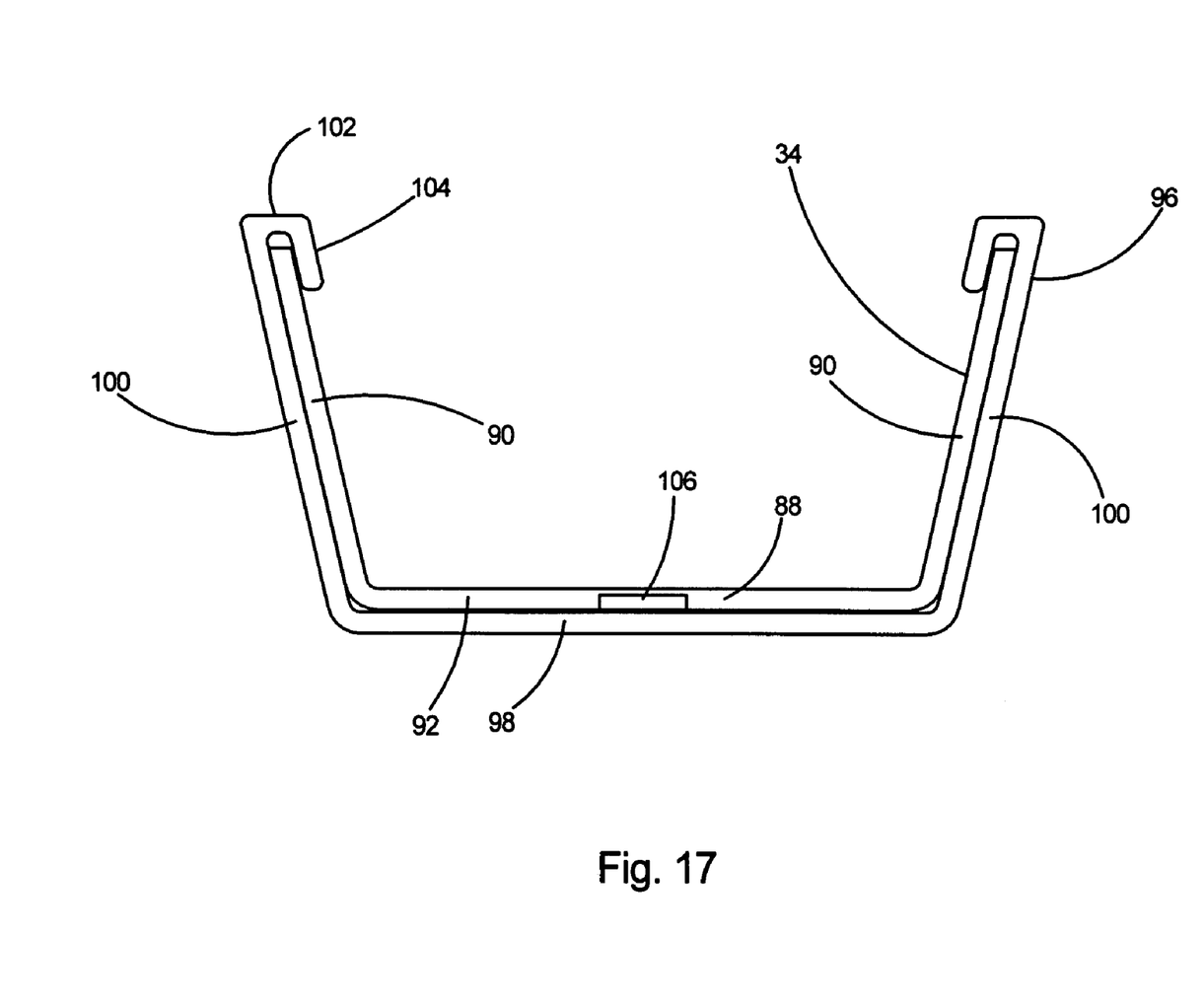
FIG. 17 is an end view of a coupling secured to a cable tray according to the present invention.

As shown in FIG. 17, a coupler 96 is used for securing together two cable trays at their ends. The coupler 96 shown in FIG. 17 has been slid upon the end 92 of a cable tray 34. The bottom wall 98 and two sidewalls 100 of the coupler 96 are of a slightly larger dimension than the bottom wall 88 and sidewalls 90 of the cable tray 34 and an end 92 of a cable tray 34 will therefore nest within the coupler 96 and be frictionally held thereto. Two cable trays 34 may therefore be connected together by sliding an end 92 of each cable tray 34 into one of the couplers 96. Top lip 102 and inner lip 104 of coupler 96 hold cable tray 34 therein and prevent it from sliding out of the coupler 96 and also limit vertical and horizontal movement of the cable tray 34 with respect to the coupler 96. Coupling the two ends of the cable trays in this manner maintains the bottom walls of the two separate cable trays substantially even and therefore causes no bending or sagging of cables or cable bundles (not shown) when they are laid therein.

Figure 18:
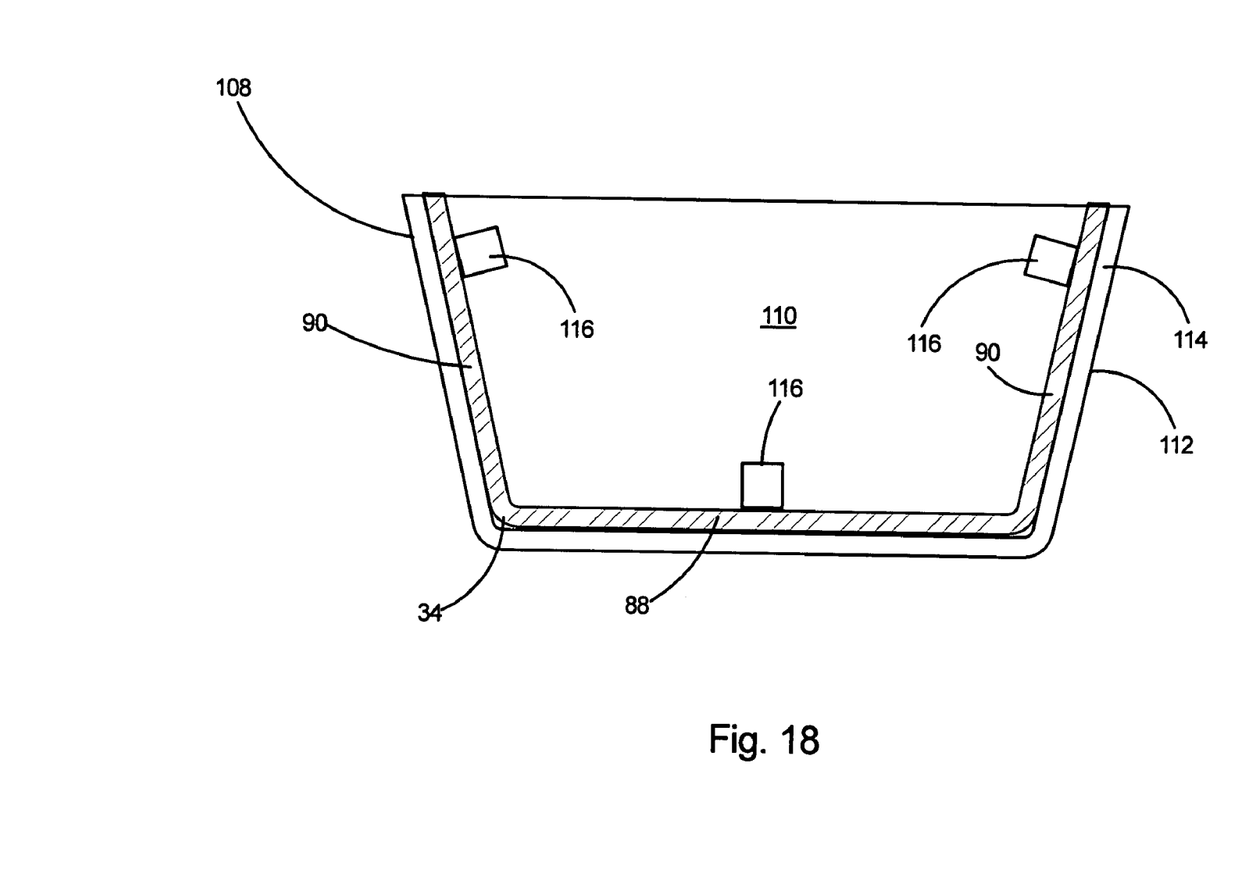
FIG. 18 is a sectional view of the end cap of FIG. 13 secured to the cable tray of FIG. 9.

With reference to FIG. 18, an end cap 108 may be used to terminate a cable tray 34. The end cap 108 is simply slid onto an end of the cable tray 34. The cable tray 34 is typically molded or extruded of plastic with the bottom wall 88 and the sidewalls 90 of the cable tray 34 of a given thickness. The end cap 108 is configured such that the distance between the post 116 and the peripheral wall 114 (see distance $d_1$ in FIG. 13) are no more than 0.010 inch larger than the thickness (see thickness $d_2$ in FIG. 9) of the bottom wall 88 and sidewalls 90 of the cable tray 34. Sliding the end cap 108 onto the cable tray 34 therefore enables a frictional fit of the end cap 108 to the cable tray 34 with the cable tray 34 frictionally held between the posts 116 and peripheral wall 114 of the end cap 108.

Figure 1:
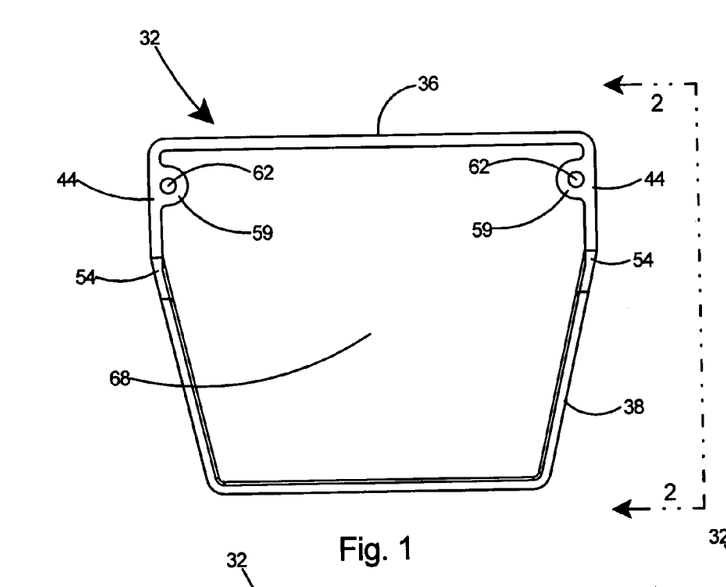
FIG. 1 is a front elevation view of the preferred embodiment of a bracket according to the present invention.
Figure 2:
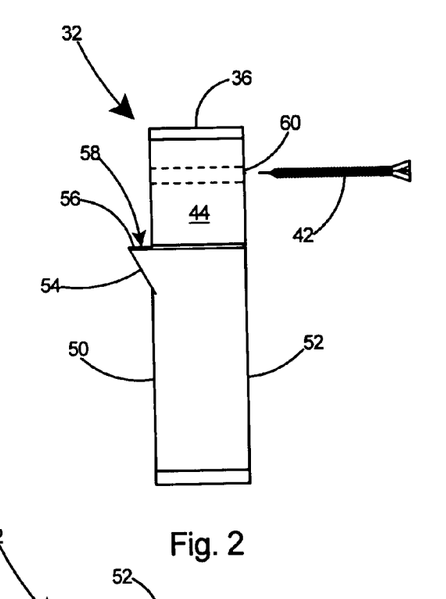
FIG. 2 is a side view of the bracket taken along line 2-2 of FIG. 1.
Figure 3:
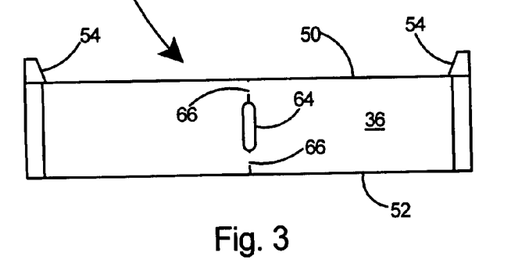
FIG. 3 is a top view of the bracket of FIG. 1.
Figure 4:
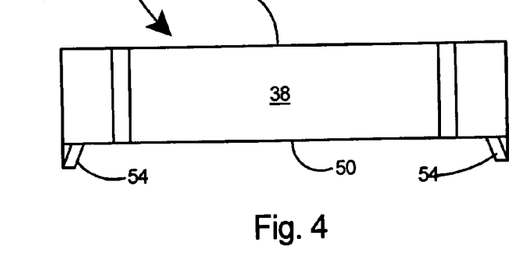
FIG. 4 is a bottom view of the bracket of FIG. 1.

The cable support assembly of the present invention can be used to support cables in a retrofit situation. A retrofit is that situation in which the cables have already been affixed to the overhead structure by ring-type hangers. With reference to FIG. 3, to use the bracket 32 to support existing cables, tin snips or a similar cutter (not shown) can be used to snip through the cuttable portion 66 of the base portion 36.

Figure 15:
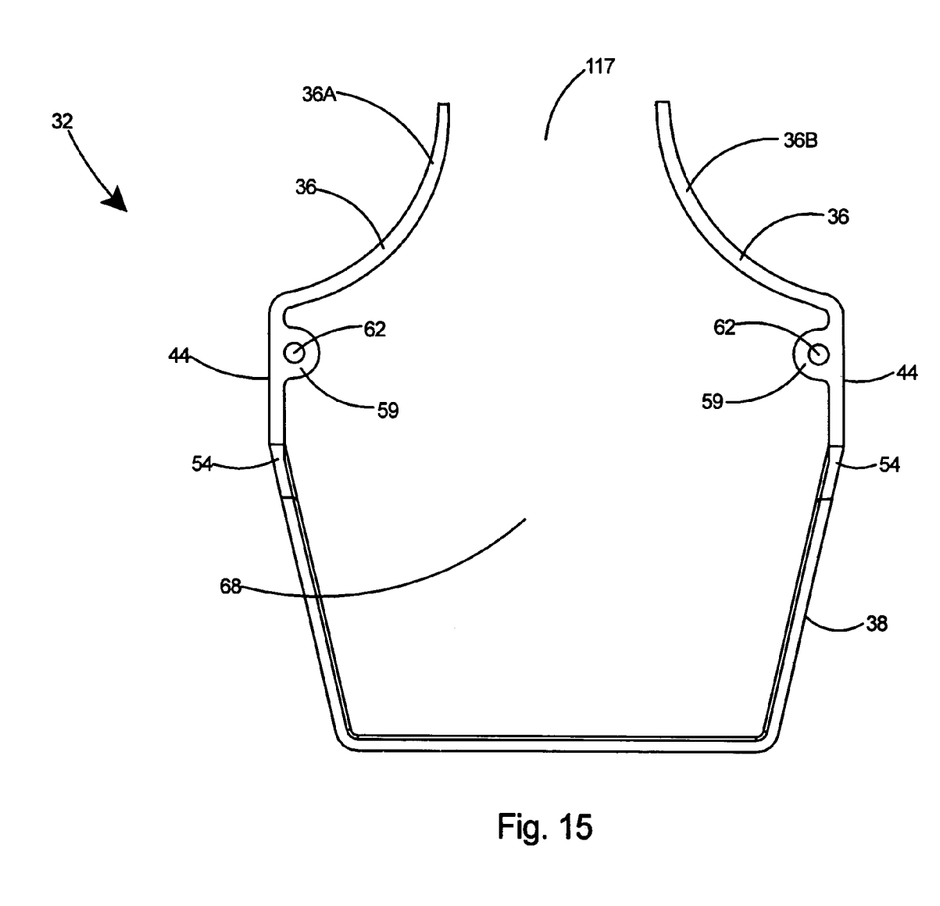
FIG. 15 is a front view of the preferred embodiment of a bracket of FIG. 1 but with the base portion cut at the cuttable portion and the resulting halves of the base portion separated to enable entry of cables in a retrofit situation.

With reference to FIG. 15, after the base portion 36 is split in a retrofit situation, the resulting two halves 36A, 36B of the base portion can be lifted upwards and outwards thereby creating a large entryway 117 into the central opening 68 of the bracket 32. The bracket 32 can then be lifted upwards over the existing cables (not shown) with the large entryway 117 allowing the cables to slip within the central opening 68 of the bracket 32. As the bracket is typically molded of a resilient plastic, the two halves 36A, 36B of the base portion will spring back essentially to their original orientation thereby closing the two halves 36A, 36B of the base portion. Fasteners (not shown) can then be driven through ears 59 and into a structure (not shown) to secure the bracket 32 thereto. Cable trays 34 can then be slid lengthwise into the central openings 68 of two adjacent brackets 32 in linear alignment and two or more cable trays joined together to form a cable support assembly in the same manner as described above for a new installation.

Although they could be constructed of metal or other materials, it is preferred that the components of the cable support assembly of the present invention, including the bracket, the end cap, the coupler, and the elongated cable tray are each formed in one piece of plastic. The bracket, the end cap, and the coupler are preferably molded of plastic and the cable tray can be molded or extruded of plastic.

Figure 19:
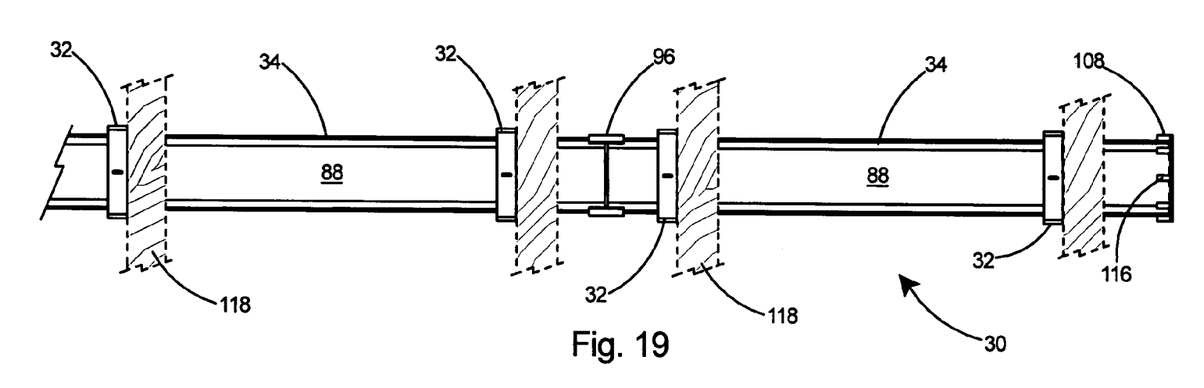
FIG. 19 is a top view of a portion of a cable support assembly according to the present invention.

With reference to FIG. 19, the top view of a portion of a cable support assembly 30 is shown according to the present invention. The cable support assembly 30 includes cable trays 34, brackets 32 secured to joists 118, a coupler 96 securing together two cable trays 34, and an end cap 108 capping one end of a cable tray.

Figure 20:
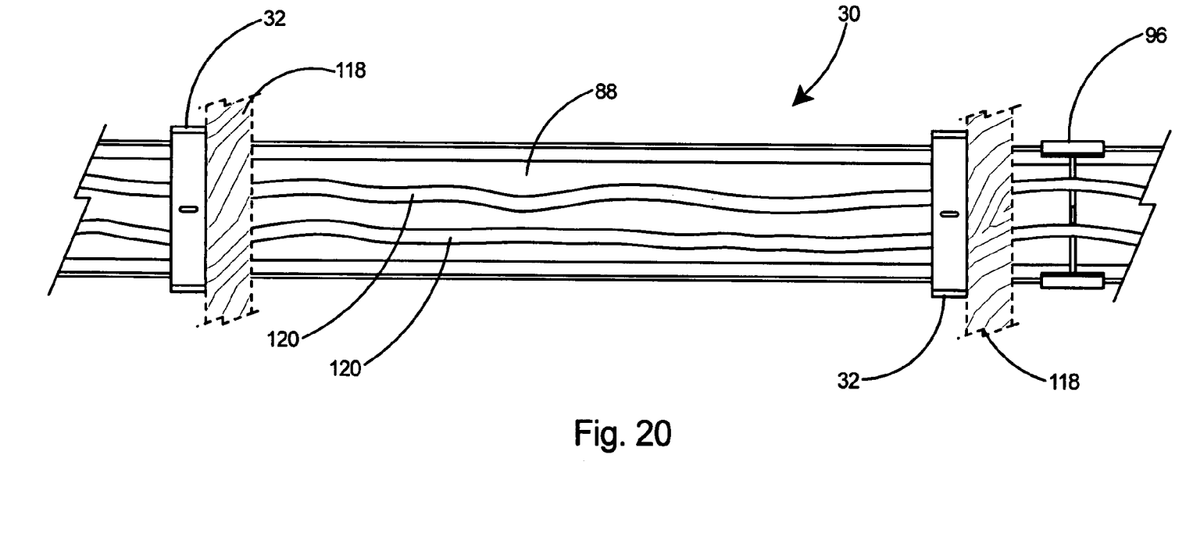
FIG. 20 is top view of a portion of a cable support assembly with electrical cables inserted within the cable tray.

FIG. 20 depicts a close up view of the left hand portion of FIG. 19 and with communications cables 120 laid therein and supported by the bottom wall 88 of the cable tray 34. The advantage of the cable support assembly 30 of the present invention is that the cables 120 are supported by the cable tray 34 and not by the hangers or brackets 32. Supported as shown, the delicate communication cables 120 are not subjected to sagging or bending as a result of being supported primarily by the hangers or brackets, as in prior art cable support systems.

Figure 5:
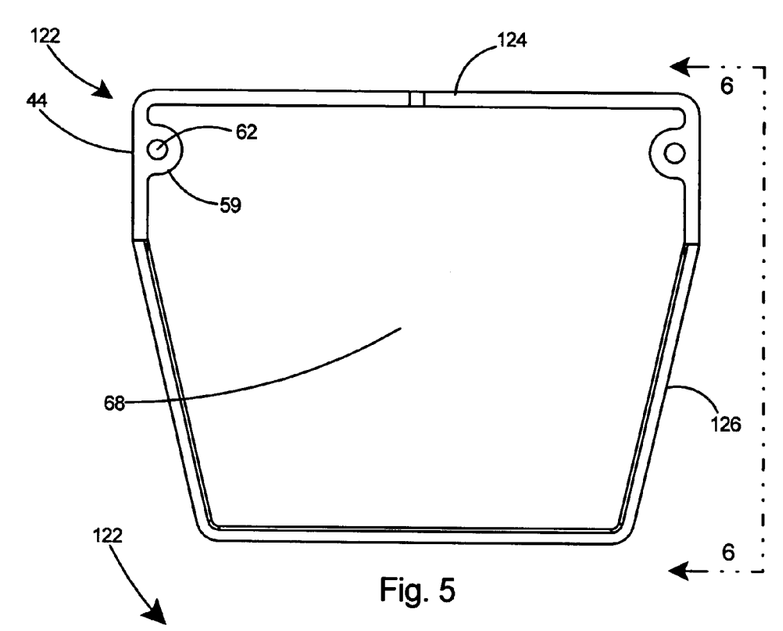
FIG. 5 is a front elevation view of a second embodiment of a bracket according to the present invention.
Figure 6:
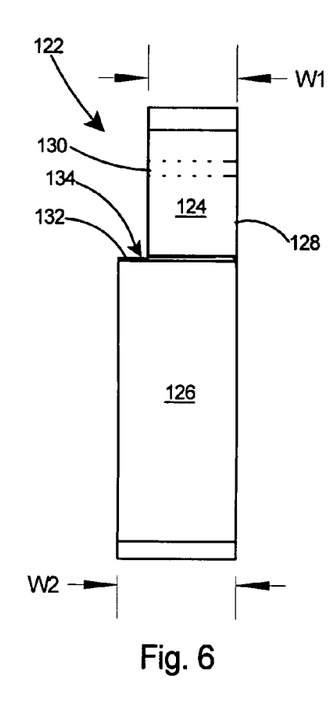
FIG. 6 is a side view of the bracket taken along line 6-6 of FIG. 5.
Figure 7:
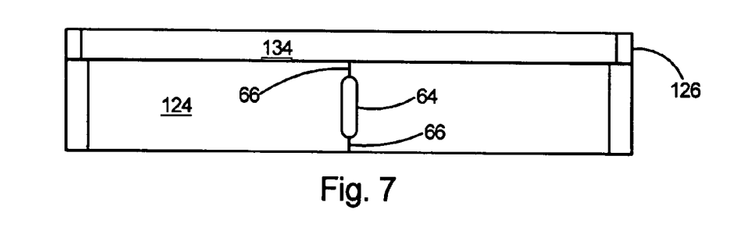
FIG. 7 is a top view of the bracket of FIG. 5.

A second embodiment of a bracket 122 according to the present invention is depicted in FIGS. 5-7. The bracket 122 includes a base portion 124 of a first width (W1) and a band portion 126 of a second width (W2). The band portion 126 and base portion 124 share a planar first edge 128 but the band portion 126 is wider than the base portion 124 and extends outwards from the second edge 130 of the base portion 124. An upper planar edge 132 provides a seat 134 for use in positioning the bracket 122 against an overhead support (not shown). A slot 64 and cuttable portion 66 are provided in the base portion 124 to enable cutting of the base portion 124 for a retrofit situation.

Figure 21:
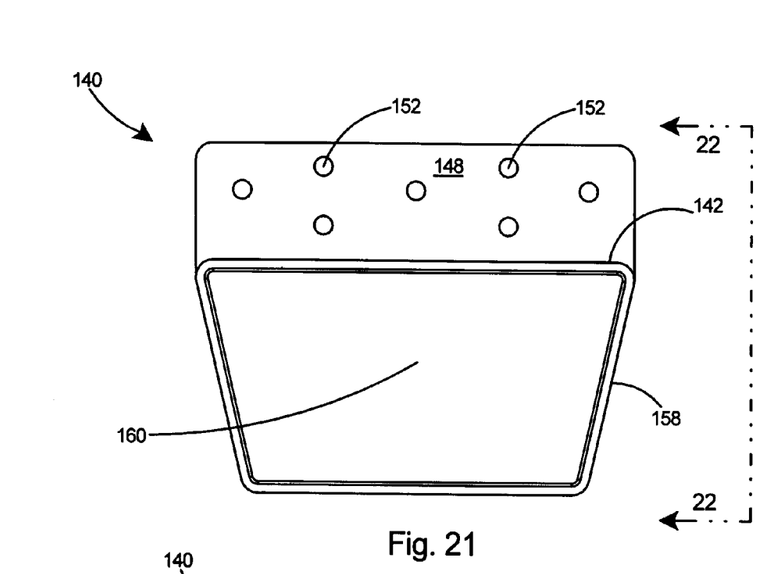
FIG. 21 is a front elevation view of a third embodiment of a bracket according to the present invention.
Figure 22:
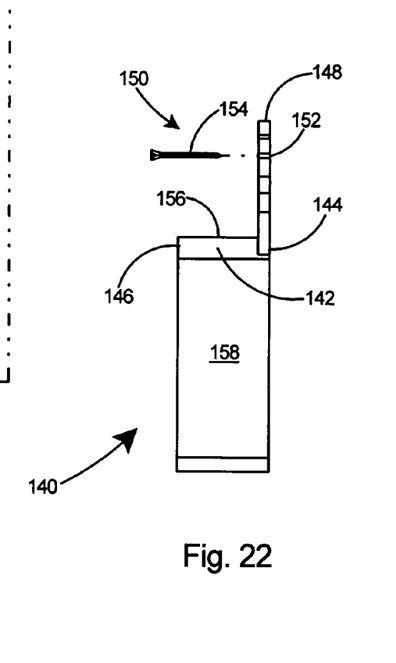
FIG. 22 is a side view of the bracket taken along line 22-22 of FIG. 21.
Figure 23:
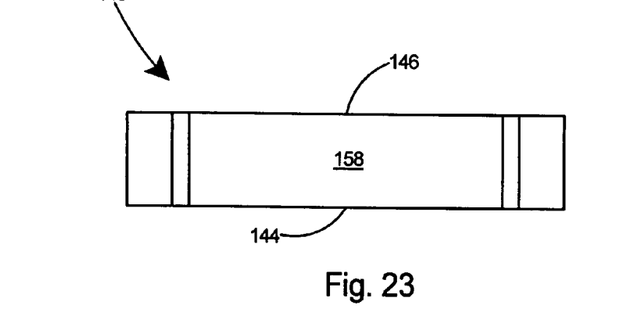
FIG. 23 is a bottom view of the bracket of FIG. 21.

A third embodiment of a bracket 140 according to the present invention is depicted in FIGS. 21-23. The bracket 140 includes a base portion 142 having two sides 144 and 146 and an integral flange 148 extending upwards along the first side 144 of the base portion 142. An attachment arrangement 150 for securing the bracket 140 to a building structure includes apertures 152 in the flange 148 and fasteners 154 that can be driven through the flange 148 and into the building structure (not shown). A seat 156 is provided at the juncture of the flange 148 and the base portion 142 for positioning the bracket 140 on an overhead structure. The bracket 140 includes a band portion 158 that extends downwardly from the base portion 142 and creates a central opening 160 therein for receipt of a cable tray in the manner described above for the preferred embodiment.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable support assembly comprising:
   a bracket including a base portion having two end portions;
   a band portion extending downward from and between said end portions and forming a central opening therein between said base portion and said band;
   an attachment arrangement associated with said base portion for securing said bracket to a building structure;
   an tooth extending laterally from said band;
   an upper planar surface on said tooth forming a seat thereon for use in positioning said bracket against the building structure;
   an elongated cable tray for carrying cables;
   said cable tray adapted to be received within said central opening of said bracket and supported by said bracket; and
   said cable tray including an interior channel for receiving and supporting therein electrical, communication, or data cables.

2. The cable support assembly of claim 1 wherein said bracket includes
   a slot in said base portion; and
   said slot extending laterally across a substantial portion of said base portion.

3. The cable support assembly of claim 2 including
   cuttable portions in said base portion of said bracket; and said cuttable portions arranged laterally on each end of said slot, whereby said cuttable portions enable splitting of said base portion into two parts thereby permitting separation of said parts to slip around existing mounted cables in a retrofit situation.

4. The cable support assembly of claim 1 including ears extending inwardly into said central opening from said end portions of said bracket.

5. The cable support assembly of claim 4 including apertures in said ears.

6. The cable support assembly of claim 5 wherein said attachment arrangement includes said apertures in said ears and fasteners associated with said apertures.

7. The cable support assembly of claim 1 wherein
said base portion includes a width; and
said band portion includes a width wider than that of said base portion.

8. The cable support assembly of claim 1 wherein
said cable tray includes a bottom wall and two sidewalls; and
said sidewalls are at an angle of between 95 and 110 degrees with respect to said bottom wall.

9. The cable support assembly of claim 1 including
a first cable tray;
a second cable tray;
ends on said first cable tray and said second cable tray; and
a coupler for connecting said first cable tray and said second cable tray together at said ends.

10. The cable support assembly of claim 9 including
a bottom wall and two sidewalls on said coupler;
a top lip extending inwardly from said sidewalls of said coupler; and
an inner lip extending downward from said top lip of said coupler.

11. The cable support assembly of claim 10 wherein
said bottom wall and two sidewalls of said coupler of a slightly larger dimension than said bottom wall and sidewalls of said cable tray; and
said first cable tray and said second cable tray may be connected together by sliding an end of each of said cable trays into one of said couplers.

12. The cable support assembly of claim 11 including
a separator tab extending upwards from said bottom wall of said coupler;
said separator tab limiting the distance a cable tray may be inserted in said coupler.

13. The cable support assembly of claim 1 including
an open end on said cable tray; and
an end cap for closing said open end of said cable tray.

14. The cable support assembly of claim 13 wherein
said end cap includes an end wall having an outer edge;
a peripheral wall extending orthogonally from said outer edge of said end wall; and
one or more posts extending orthogonally from said end wall proximate said peripheral wall,
whereby sliding of said end cap onto an end of said cable tray enables a frictional fit of said end cap to said cable tray.

15. The cable support assembly of claim 14 wherein
said cable tray includes a bottom wall and two sidewalls;
said bottom wall and said sidewalls of said cable tray include a thickness; and
the distance between said post and said peripheral wall of the end cap are no more than 0.010 inch larger than the thickness of said bottom wall and sidewalls of said cable tray.

16. The cable support assembly of claim 1 wherein said bracket and said elongated cable tray are each formed in one piece of plastic.

17. A method of supporting cables from a building structure including the steps of:
(a) providing a bracket including a base portion and a downward-depending band forming a central opening therein, a tooth extending laterally from said band, a seat on said tooth, and an attachment arrangement for securing said bracket to a building structure;
(b) providing an elongated cable tray for carrying cables adapted to be received within said central opening, said cable tray including an interior channel for receiving and supporting therein electrical, communication, or data cables;
(c) securing two of said brackets to the building structure using said attachment arrangement, each of said brackets aligned linearly on the building structure;
(d) sliding a first of said cable trays end-wise within said central openings of each of said secured brackets;
(e) providing a coupling member for securing together two of said cable trays;
(f) repeating steps (a) through (d) above for a second cable tray in linear alignment with said first cable tray;
(g) sliding a first end of said coupling member onto an end of said first cable tray;
(h) sliding said second cable tray into a second end of said coupling member;
(i) repeating steps (f) through (h) as needed until a desired length of supported cable tray is reached; and
(j) laying cables within said cable trays.

* * * * *